Patented Nov. 13, 1934

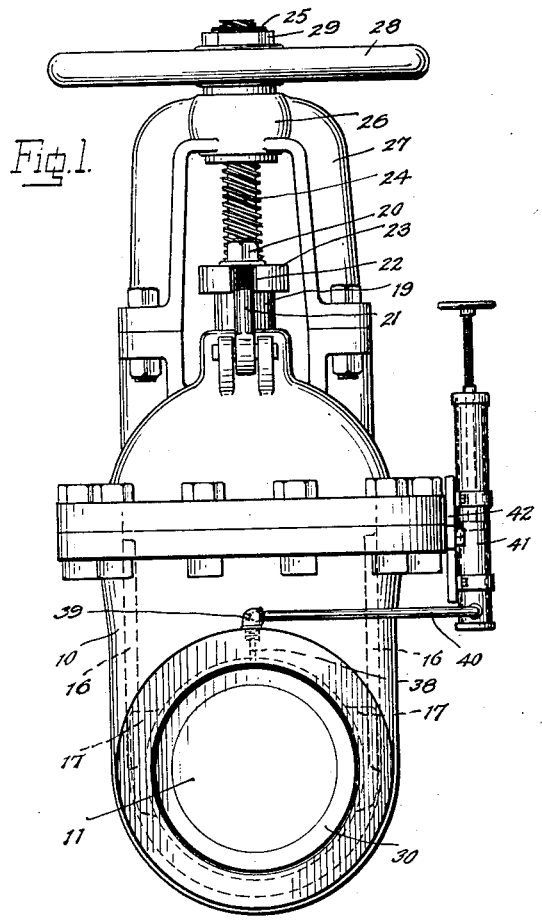
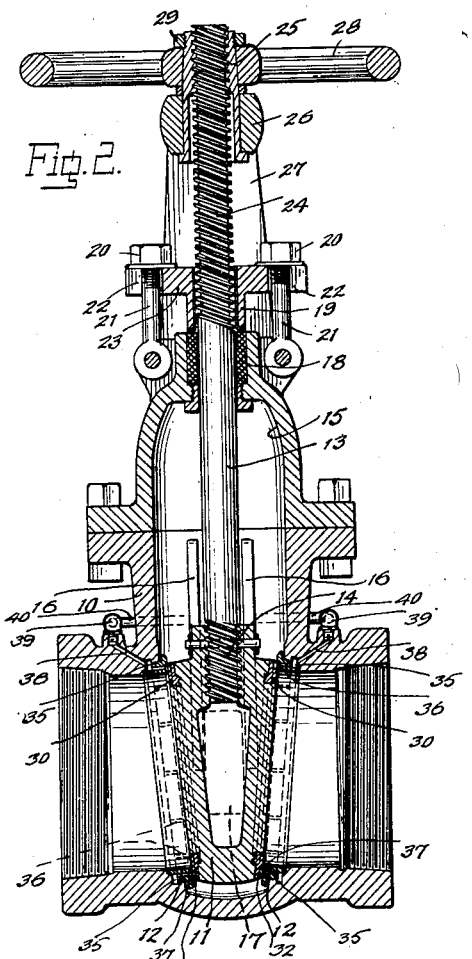
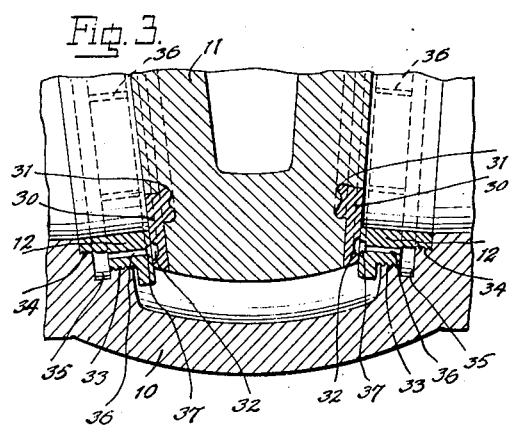
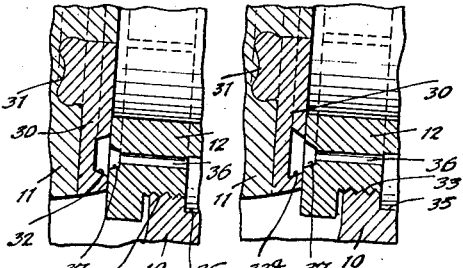

1,980,768

UNITED STATES PATENT OFFICE 1,980,768

LUBRICATED GATE VALVE

Harry G. Specht, Montclair, N. J., assignor to Eastwood Wire Corporation, Belleville, N. J., a corporation of New Jersey Application December 2, 1930, Serial No. 499,480

4 Claims. (Cl. 251—59)

The present invention relates to a lubricated gate valve, and has for an object to provide a valve of this character in which lubricant may be applied to the valve seat while the valve gate is in closed position, and in which such lubricant may be applied under pressure, so that in the event that the valve becomes stuck the pressure of the lubricant may be utilized to free it. Another object is to provide a valve in which lubricant will be distributed over the valve seat and which will be carried and retained by the valve upon opening the valve, so that there will be relatively small loss of lubricant from washing out when the valve is open. It is a further object to provide a lubricated valve seat which will form a positive and effectual seal against leakage.

With the above and other objects in view an embodiment of the invention is shown in the accompanying drawing, and this embodiment will be hereinafter more fully described with reference thereto and the invention will be finally pointed out in the claims.

In the drawing:

Fig. 1 is an end elevation of a valve, according to the present embodiment of the invention.

Fig. 2 is a vertical sectional view thereof.

Fig. 3 is an enlarged vertical sectional view of the lower end portion.

Fig. 4 is a detail fragmentary sectional view showing one form of lubricant groove employed.

Fig. 5 is a similar view showing a modified form of lubricant groove.

Similar reference characters indicate corresponding parts throughout the several figures of the drawing.

Referring to the drawing, the gate valve illustrated is of conventional type, and comprises a casing 10, having a valve 11 and converging valve seat rings 12—12, the valve being fixedly connected to the lower end of a spindle 13, as at 14, and adapted in the open position to be moved upwardly into a chamber 15. Vertical guide ribs or tracks 16 are provided at each side of the casing which are engaged by lugs 17 formed on the sides of valve. The spindle is non-rotatable and moves through a packing gland 18 and a bushing 19 at the upper end of the casing, the bushing 19 adapted to be tightened upon the packing gland by means of nuts 20 provided on hinged bolts 21 engaged in cut-outs 22 in the flange 23 of said bushing. The upper end of the spindle is provided with a spiral thread 24, engaged in a rotary nut 25 mounted in the bearing end 26 of a yoke 27 superimposed on the casing, and to which nut a hand wheel 28 is secured by a jam nut 29. Obviously turning of the hand wheel and nut in one or the other directions raises or lowers the valve.

The valve is provided at each side with a seating ring 30, preferably of bronze, suitably secured to the valve as by swaging, as at 31, and within this ring there is provided a circumferential lubricant groove 32. The valve seats which close the grooves 32 are in the form of threaded rings, preferably of bronze, these rings having a large diameter threaded portion 33 and a smaller diameter threaded extension portion 34, and within the casing, and in relation to be closed and sealed by screwing in of the threaded portions 33 and 34, there is provided a circumferential lubricant chamber 35. A series of ports 36 are provided in the rings 12 establishing communication at a suitable number of spaced points between the chambers 35 and circumferential grooves 37 in the valve seating surfaces, these grooves 37 being in register in the closed position of the valve, with the circumferential grooves 32 of the valve. The grooves 32 are of larger extent and capacity than the grooves 37, and are adapted upon opening of the valve to retain the lubricant therein and through capillary action to draw some of the lubricant from the smaller grooves 37 during the initial opening movement.

Ducts 38—38 in the casing connect the respective chambers 35 with check-valve fittings 39—39 secured in the casing at each side, and which are connected by tubes 40—40 to the lower end of a suitable lubricant gun 41, secured upon the side of the casing by a bracket 42.

The lubricant in the grooves 32 effectually seals the valve against leakage, at the same time maintaining the seating surfaces in such lubricated condition that the valve may be readily opened. Should it become stuck the lubricant may be subjected to pressure which will free the seat. Upon closing of the valve any lubricant which may have become washed out is readily renewed by operation of the gun 41.

In Fig. 4 the groove 32 is shown as having outwardly divergent side walls while in the form illustrated in Fig. 5 a modified form of groove 32ª is employed having inwardly diverging or undercut side walls.

I have illustrated and described preferred and satisfactory embodiments of my invention, but it will be obvious that changes may be made therein within the spirit and scope thereof, as defined in the appended claims.

Having thus described my invention what I claim and desire to secure by Letters Patent is:

1. In a valve, a valve body, a valve seat in said body, a valve adapted to engage said seat, a lubricant channel in said valve closed by said seat in the closed position of said valve, said lubricant channel having inwardly diverging side walls adapted to retain lubricant during the opening of the valve and in the open position of the valve and when out of register with said valve seat.

2. In a gate valve, a valve body, valve seating means in said body comprising a pair of opposed valve seats, each having a continuous circumferential lubricant channel, a multiple-faced valve having seating surfaces at each side adapted to engage said seats of the body and each having a continuous circumferential lubricant channel adapted to register with said lubricant channels of the seats in the closed position of the valve, and lubricant conducting means communicating with said channels, said channels of the valve being relatively larger in cross sectional area than said channels of the seats and having inwardly diverging side walls, whereby a larger amount of lubricant remains in said channels of the valve during the opening of the valve than remains in said channels of the valve seats.

3. In a gate valve, a valve body, valve seating means in said body comprising a pair of opposed valve seats, each having a continuous circumferential lubricant channel, a multiple-faced valve having seating surfaces at each side adapted to engage said seats of the body and each having a continuous circumferential lubricant channel adapted to register with said lubricant channels of the seats in the closed position of the valve, and lubricant conducting means communicating with said channels, said channels of the valve being relatively larger in exposed surface area than said channels of the seats and having inwardly diverging side walls, whereby a larger amount of lubricant remains in said channels of the valve during the opening of the valve than remains in said channels of the valve seats.

4. In a gate valve, a valve body, valve seating means in said body comprising a pair of opposed valve seats, each having a continuous circumferential lubricant channel, a multiple-faced valve having seating surfaces at each side adapted to engage said seats of the body and each having a continuous circumferential lubricant channel adapted to register with said lubricant channels of the seats in the closed position of the valve, and lubricant conducting means communicating with said channels, said channels of the valve being relatively larger in exposed surface area than said channels of the seats and having inwardly diverging side walls, whereby a larger amount of lubricant remains in said channels of the valve during the opening of the valve than remains in said channels of the valve seats, the edges of said channels of the valve seats being spaced from and between the edges of said channels of the valve.

HARRY G. SPECHT.